US011373183B2

(12) United States Patent
Rohlfing et al.

(10) Patent No.: US 11,373,183 B2
(45) Date of Patent: Jun. 28, 2022

(54) METHOD AND SYSTEM FOR INSTANTANEOUS PAYMENT USING RECORDED GUARANTEES

(71) Applicant: MasterCard International Incorporated, Purchase, NY (US)

(72) Inventors: Joan Lee Rohlfing, Maryland Heights, MO (US); Steven Charles Davis, Saint Peters, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1104 days.

(21) Appl. No.: 15/148,121

(22) Filed: May 6, 2016

(65) Prior Publication Data
US 2017/0323294 A1 Nov. 9, 2017

(51) Int. Cl.
*G06Q 20/40* (2012.01)
*G06Q 20/36* (2012.01)
(Continued)

(52) U.S. Cl.
CPC ......... *G06Q 20/401* (2013.01); *G06Q 20/065* (2013.01); *G06Q 20/10* (2013.01);
(Continued)

(58) Field of Classification Search
None
See application file for complete search history.

(56) References Cited

U.S. PATENT DOCUMENTS 5,384,449 A * 1/1995 Peirce ................ G06Q 20/4037
235/380
2005/0251469 A1* 11/2005 Nandakumar ......... G06Q 20/02
705/35

(Continued)

FOREIGN PATENT DOCUMENTS

CN 104320262 A 1/2015
WO 0158242 A2 8/2001
WO 2011/084310 A2 7/2011

OTHER PUBLICATIONS

Biella, M., & Zinetti, V. (2016). Blockchain Technology and Applications From a Financial Perspective. Blockchain Technology and Applications From a Financial Perspective (pp. 1-33). UniCredit. (Year: 2016).*

(Continued)

*Primary Examiner* — Neha Patel
*Assistant Examiner* — Nicholas K Phan
(74) *Attorney, Agent, or Firm* — Buchanan Ingersoll & Rooney PC

(57) ABSTRACT

A method for processing a guaranteed electronic transaction, includes: storing account profile, each include an account number and balance; receiving a transaction message from an acquiring financial institution via a payment network, the message including a specific account number, transaction amount, and payment guarantee data; identifying a specific account profile that includes the specific account number; deducting the transaction amount from the account balance in the specific account profile; generating a record of pay- (Continued)

ment guarantee that includes the transaction amount and data associated with the payment guarantee data; generating a return message including a response code indicating transaction approval and data associated with the generated record; transmitting the generated record to a computing system via a communication network; and transmitting the generated return message to the acquiring financial institution via the payment network.

20 Claims, 7 Drawing Sheets

(51) Int. Cl.
    *G06Q 20/38*      (2012.01)
    *G06Q 20/06*      (2012.01)
    *G06Q 20/10*      (2012.01)

(52) U.S. Cl.
    CPC ..... *G06Q 20/3674* (2013.01); *G06Q 20/3825* (2013.01); *G06Q 20/3827* (2013.01); *G06Q 20/3829* (2013.01); *G06Q 2220/00* (2013.01)

(56) References Cited

U.S. PATENT DOCUMENTS

| | | | | |
|---|---|---|---|---|
| 2011/0145082 A1* | 6/2011 | Hammad | ............ | G06Q 20/202 705/24 |
| 2011/0191162 A1* | 8/2011 | Blackhurst | ............ | G06Q 20/40 705/14.39 |
| 2014/0114857 A1* | 4/2014 | Griggs | ............ | G06Q 40/00 705/44 |
| 2015/0235221 A1* | 8/2015 | Murphy, Jr. | ............ | G06Q 20/02 705/75 |
| 2016/0292672 A1* | 10/2016 | Fay | ............ | G06Q 20/36 |
| 2016/0307170 A1* | 10/2016 | Harkey | ............ | G06Q 50/01 |
| 2016/0371689 A1* | 12/2016 | Brown | ............ | G06Q 20/405 |

OTHER PUBLICATIONS

International Search Report and Written Opinion issued by the International Search Authority dated Jun. 29, 2017 in corresponding PCT Application No. PCT/US2017/024424 (14 pages).

Simon Barber et al: "Bitter to Better How to Make Bitcoin a Better Currency", Dated a Mar. 2012 (Mar. 2, 2012), Financial Cryptography and Data Security, Springer Berlin Heidelberg, Berlin, Heidelberg, pp. 399-414, XP047013846, ISBN: 978-3-642-32945-6 p. 401, lines 29-34.

The extended European Search Report dated Mar. 24, 2021, by the European Patent Office in corresponding European Patent Application No. 21153386.4-1218. (11 pages).

Office Action (First Examination Report) dated Jan. 19, 2021, by the Patent Office, Government of India, in corresponding India Patent Application No. 201817004153 with an English Translation of the Office Action. (8 pages).

Office Action (First Office Action) dated Sep. 13, 2021, by the China National Intellectual Property Administration in corresponding Chinese Patent Application No. 201780027631.4 and an English Translation of the Office Action. (19 pages).

\* cited by examiner

METHOD AND SYSTEM FOR INSTANTANEOUS PAYMENT USING RECORDED GUARANTEES

FIELD

The present disclosure relates to the use of recorded guarantees for payment transactions for verification by acquiring institutions to facilitate instantaneous payment to a merchant involved in the payment transaction, specifically the use of a blockchain or other third party network for verification of a guarantee associated with the payment transaction.

BACKGROUND

When transacting with a merchant, many consumers elect to use issued payment instruments, such as credit cards and checks, in place of traditional paper fiat currency. While such payment instruments offer a level of convenience to the consumer, such as protections against fraud and theft, accounting of transactions, etc., the use of such instruments can be disadvantageous for merchants. For instance, it may take several days for a merchant to receive funds for a transaction conducted using an issued payment instrument due to processing, clearing, and settlement times, whereas transactions conducted using paper fiat currency enable the merchant to possess the funds immediately. The use of issued payment instruments can also be disadvantageous for merchants as there is often no guarantee that the transaction will successfully clear, leaving the merchant at risk of receiving no payment at all if the consumer does not actually have the funds.

In an effort to combat such disadvantages, some issuing financial institutions began to issue guaranteed checks to their customers. A guaranteed check is a check for which the underlying amount is guaranteed for payment, so that the acquiring financial institution and merchant can be assured by the issuing financial institution that the funds represented by the check by the consumer are readily available for payment to the merchant. However, many merchants may lack the computing systems necessary for the processing of guaranteed checks. In addition, the use of checks is often cumbersome, if not impossible, for Internet-based and other types of e-commerce transactions. Even further, many consumers often find the use of checks to be inconvenient and may prefer to use other payment instruments, such as payment cards.

Thus, there is a need for a technical solution where a payment transaction can be guaranteed in a manner that is readily verifiable by an acquiring financial institution and/or merchant, and where the guarantee can be used in conjunction with multiple types of payment instruments as well as multiple transaction types, including e-commerce transactions. By enabling the use of the guarantee with multiple payment instruments and transaction types, the guarantee may be used in more situations with a higher convenience to both consumers and merchants, which may result in merchants receiving instantaneous, guaranteed payment, while maintaining a high level of consumer convenience.

SUMMARY

The present disclosure provides a description of systems and methods for processing a guaranteed electronic transaction.

A method for processing a guaranteed electronic transaction, includes: storing, in an account database of a processing server, a plurality of account profiles, wherein each account profile includes a structured data set related to a transaction account including at least a transaction account number and an account balance; receiving, by a receiving device of the processing server, a transaction message related to an electronic transaction via a payment network, wherein the transaction message originates from an acquiring financial institution and is formatted based on one or more standards, where the transaction message includes a plurality of data elements including at least a first data element configured to store a primary account number, a second data element configured to store a transaction amount, a third data element configured to store payment guarantee data, and one or more additional data elements configured to store additional transaction data; executing, by a querying module of the processing server, a first query on the account database to identify a specific account profile where the included transaction account number corresponds to the primary account number stored in the first data element included in the received transaction message; executing, by the querying module of the processing server, a second query on the account database to deduct at least the transaction amount stored in the second data element included in the received transaction message from the account balance included in the identified specific account profile; generating, by a generation module of the processing server, a record of payment guarantee, wherein the record of payment guarantee includes at least the transaction amount and data associated with the payment guarantee data stored in the third data element included in the received transaction message; generating, by the generation module of the processing server, a return message, wherein the return message is formatted based on the one or more standards and includes a plurality of data elements including at least a first data element configured to store a response code indicative of approval of the related electronic transaction and a second data element configured to store data associated with the generated record of payment guarantee; electronically transmitting, by a transmitting device of the processing server, the generated record of payment guarantee to a computing system via a communication network; and electronically transmitting, by the transmitting device of the processing server, the generated return message to the acquiring financial institution via the payment network.

A system for processing a guaranteed electronic transaction includes: an account database of a processing server configured to store a plurality of account profiles, wherein each account profile includes a structured data set related to a transaction account including at least a transaction account number and an account balance; a receiving device of the processing server configured to receive a transaction message related to an electronic transaction via a payment network, wherein the transaction message originates from an acquiring financial institution and is formatted based on one or more standards, where the transaction message includes a plurality of data elements including at least a first data element configured to store a primary account number, a second data element configured to store a transaction amount, a third data element configured to store payment guarantee data, and one or more additional data elements configured to store additional transaction data; a querying module of the processing server configured to execute a first query on the account database to identify a specific account profile where the included transaction account number corresponds to the primary account number stored in the first data element included in the received transaction message, and a second query on the account database to deduct at least the transaction amount stored in the second data element included in the received transaction message from the account balance included in the identified specific account profile; a generation module of the processing server configured to generate a record of payment guarantee, wherein the record of payment guarantee includes at least the transaction amount and data associated with the payment guarantee data stored in the third data element included in the received transaction message, and a return message, wherein the return message is formatted based on the one or more standards and includes a plurality of data elements including at least a first data element configured to store a response code indicative of approval of the related electronic transaction and a second data element configured to store data associated with the generated record of payment guarantee; and a transmitting device of the processing server configured to electronically transmit the generated record of payment guarantee to a computing system via a communication network, and the generated return message to the acquiring financial institution via the payment network.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
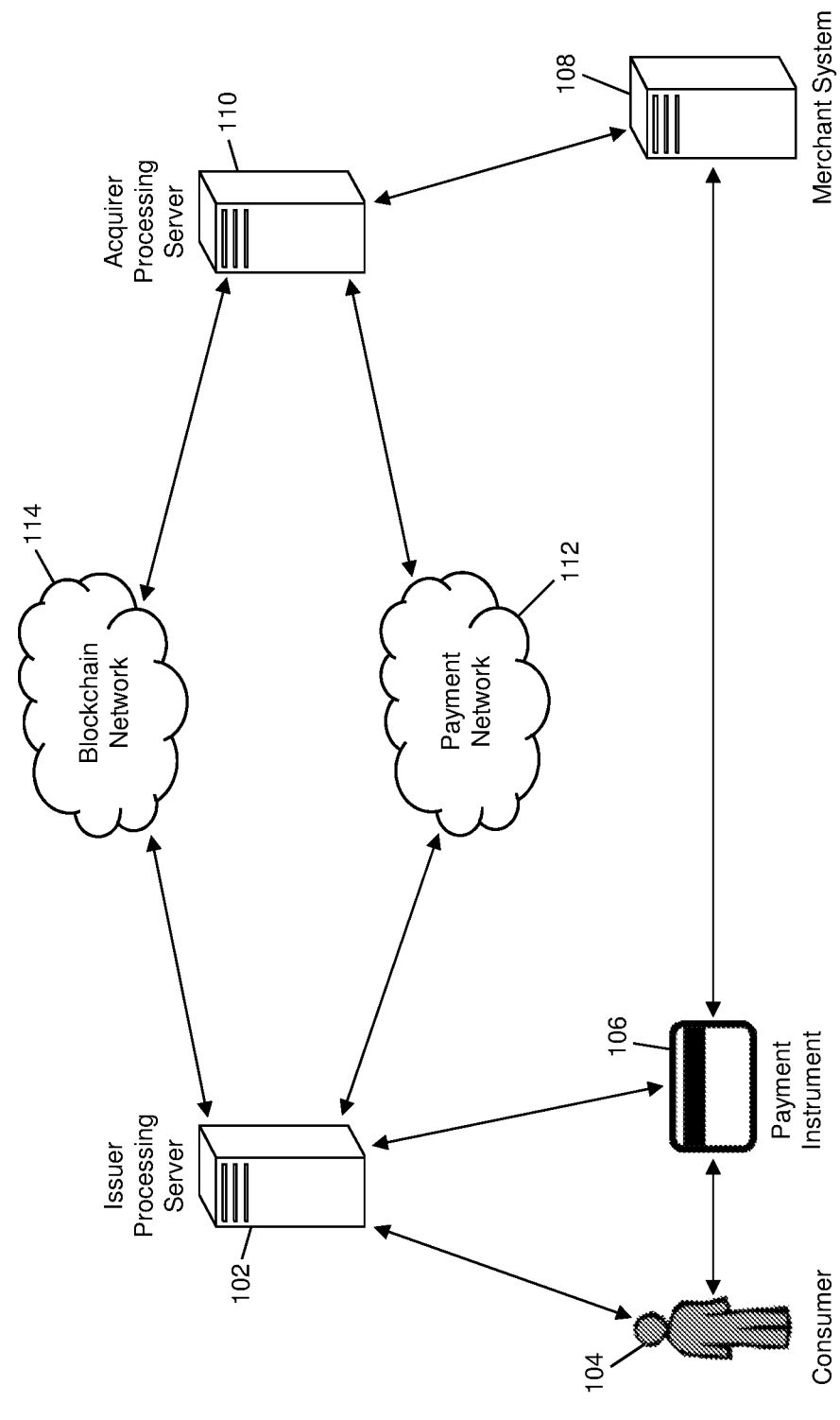
FIG. 1 is a block diagram illustrating a high level system architecture for processing guaranteed electronic transactions for instantaneous payment to merchants in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require any special knowledge in offered products. In some embodiments, an entity involved in a single transaction may be considered a merchant. In some instances, as used herein, the term "merchant" may refer to an apparatus or device of a merchant entity.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Payment Rails—Infrastructure associated with a payment network used in the processing of payment transactions and the communication of transaction messages and other similar data between the payment network and other entities interconnected with the payment network. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, additional information may be captured, such as a source address, timestamp, etc. In some embodiments, a blockchain may also consist of additional, and in some instances arbitrary, data that is confirmed and validated by the blockchain network through proof of work and/or any other suitable verification techniques associated therewith. In some cases, such data may be included in the blockchain as part of transactions, such as included in additional data appended to transaction data. In some instances, the inclusion of such data in a blockchain may constitute a transaction. In such instances, a blockchain may not be directly associated with a specific digital, virtual, fiat, or other type of currency.

System for Processing Guaranteed Electronic Transactions

FIG. 1 illustrates a system 100 for the processing of electronic transactions with recorded guarantees to facilitate instantaneous payment to merchants, where recorded guarantees may be posted to a third party network for independent verification.

The system 100 may include an issuer processing server 102. The issuer processing server 102, discussed in more detail below, may be configured to generate a record of payment guarantee for a payment transaction and process a subsequent payment transaction. The issuer processing server 102 may issue a transaction account to a consumer 104. As part of the issuing of the transaction account, the issuer processing server 102 may issue a payment instrument 106 to the consumer 104 for use in funding payment transaction using the corresponding transaction account. The payment instrument 106 may be any type of payment instrument suitable for performing the functions discussed herein, such as a credit card, debit card, virtual payment card, controlled payment number, etc. The payment instrument 106 may be a physical payment instrument, such as a physical payment card, or may be a virtual payment instrument, such as a payment token issued to and stored on an electronic communication device, such as a smart phone or wearable computing device.

The consumer 104 may initiate a payment transaction at a merchant system 108 for the purchase of one or more goods or services. As part of the payment transaction, the consumer 104 may present the payment instrument 106 to the merchant system 108 for conveyance of payment details for use in funding the payment transaction. The merchant system 108 may receive the payment details from the payment instrument 106 using a suitable method based on the type of payment instrument 106, such as the reading of a magnetic strip encoded with payment details, receipt of a data signal encoded with payment details electronically transmitted via near field communication, reading of a machine-readable code encoded with payment details displayed on a mobile communication device, etc. The merchant system 108 may receive the payment details and may submit the payment details and additional transaction data to an acquiring processing server 110 using a suitable communication network and method. In some instances, the merchant system 108 may electronically transmit the payment details and additional transaction data to the acquiring processing server 110 via payment rails associated with a payment network 112. The additional transaction data may include at least a transaction amount, and may also include additional data, such as a transaction time, transaction date, geographic location, merchant identifier, point of sale identifier, product data, merchant data, consumer data, offer data, reward data, loyalty data, etc.

The acquiring processing server 110 may receive the payment details and transaction data and may generate a transaction message for the payment transaction. The transaction message may be a specially formatted data message formatted pursuant to one or more standards governing the exchange of financial transaction messages, such as the International Organization of Standardization's ISO 8583 standard. The transaction message may include a message type indicator indicative of a type of transaction message, such as an authorization request. The transaction message may also include a plurality of data elements configured to store data associated with the payment transaction, including a first data element configured to store a primary account number read from the payment instrument 106, a second data element configured to store the transaction amount, and one or more additional data elements configured to store the additional transaction data and payment details. In some instances, the transaction message may also include one or more bitmaps, which may indicate the data elements included in the transaction message and the data stored therein.

In some embodiments, the plurality of data elements included in the transaction message may also include a data element configured to store payment guarantee data. The payment guarantee data may be data used by the issuer processing server 102 in the generation and/or submission of a record of guaranteed payment. As discussed in more detail below, the payment guarantee data may include data associated with a blockchain network 114 for the posting of a record of guaranteed payment to the blockchain network 114. The blockchain network 114 may be a network configured to store a blockchain, which may be a ledger of electronic transactions that may include record of guaranteed payments. In such instances, the payment guaranteed data may include an identifier associated with a blockchain network 114 used by the acquirer processing server 110 and a public key or destination address associated with the acquirer processing server 110 for receipt of the record of guaranteed payment. In some instances, the payment guarantee data may be an indication that the consumer 104 has requested instant payment for the transaction. In some cases, a merchant system 108 may provide an incentive for the consumer 104 to provide instant payment, such as a discount, reward points, extra products or services, etc.

The acquirer processing server 110 may electronically transmit the transaction message for the payment transaction to the payment network 112 via the payment rails. The payment network 112 may perform any necessary processing of the received transaction message, such as fraud scoring, the application of transaction controls, etc., and may forward the transaction message to the issuer processing server 102 via the payment rails. In some instances, the payment network 112 may identify the issuer processing server 102 via the primary account number stored in the corresponding data element included in the transaction message, such as based on a bank identification number (BIN) (also known as issuer identification number (IIN)), or other identification value included in the primary account number.

The issuer processing server 102 may receive the transaction message via the payment rails, and may then generate a record of guaranteed payment for the payment transaction. The issuer processing server 102 may identify the transaction account used in the payment transaction (e.g., associated with the consumer 104 and payment instrument 106, identified via the primary account number stored in the corresponding data element included in the transaction message) and may verify that the transaction account has sufficient balance to cover the transaction amount as stored in the corresponding data element included in the transaction message. The issuer processing server 102 may deduct the transaction amount from the account balance in the transaction account (e.g., or increase a balance due, as applicable, such as based on the type of transaction account). The issuer processing server 102 may also perform any additional actions necessary for approval of the payment transaction for payment of the transaction amount by the transaction account associated with the consumer 104, such as fraud detection analysis, etc. The issuer processing server 102 may then generate the record of guaranteed payment for the payment transaction.

In embodiments where the blockchain network 114 is used, the issuer processing server 102 may generate a blockchain transaction as the record of payment guarantee. The blockchain transaction may be a transaction for payment of the transaction amount stored in the corresponding data element included in the received transaction message to a destination address associated with the acquirer processing server 110. The destination address may be a destination address included in the payment guarantee data stored in the transaction message or may be a destination address generated by the issuer processing server 102 using a public key stored in the payment guarantee data. Methods for the generation of a blockchain destination address using a public key will be apparent to persons having skill in the relevant art. The issuer processing server 102 may then electronically transmit the generated blockchain transaction to the blockchain network 114 or a computing node associated therewith for posting to the blockchain.

The issuer processing server 102 may generate a response transaction message that indicates approval of the payment transaction. In some instances, the response transaction message may be a newly-generated transaction message. In other instances, the response transaction message may be a modification of the received transaction message. The response transaction message may include a message type indicator indicative of an authorization response and may include a plurality of data elements including a data element configured to store a response code, which indicates approval of the payment transaction. In instances where the payment transaction may not have been approved by the issuer processing server 102 (e.g., due to fraud, insufficient balance, etc.), the response code may indicate that the payment transaction was not approved and no record of guaranteed payment may be generated or provided.

The plurality of data elements may also include a data element configured to store data associated with the generated record of guaranteed payment. In embodiments where the blockchain network 114 is used, the data associated with the generated record of guaranteed payment may include data associated with the blockchain transaction. The data may include, for example, a transaction identifier provided by the blockchain network 114 for the blockchain transaction, or a hash generated using the blockchain transaction. In other embodiments, the data associated with the record of guaranteed payment may include a hash generated by the issuer processing server 102 using the record of guaranteed payment. In some instances, the data may be data agreed upon by the acquirer processing server 110 and issuer processing server 102 to indicate that the transaction has guaranteed payment.

The issuer processing server 102 may then electronically transmit the response transaction message to the payment network 112 via the payment rails. The payment network 112 may forward the response transaction message to the acquirer processing server 110. The acquirer processing server 110 may review the received response transaction message, which indicates that the transaction was approved and includes the data associated with the record of guaranteed payment. The acquirer processing server 110 may perform any actions associated with the approval of the payment transaction, such as by forwarding approval of the transaction to the merchant system 108. The merchant system 108 may then finalize the payment transaction, such as by furnishing the transacted-for goods or services to the consumer 104.

As part of the processing of the received response transaction message, the acquirer processing server 110 may validate the data as validation that payment of the transaction amount for the payment transaction is guaranteed. In instances where the blockchain network 114 is used, the acquirer processing server 110 may retrieve the blockchain from the blockchain network 114 and identify that the blockchain transaction associated with the payment transaction for payment of the transaction amount to the destination address associated with the acquirer processing server 110 was successfully posted to the blockchain. In some embodiments, the blockchain transaction may further include an identification value associated with the payment transaction (e.g., as included in a data element included in the transaction message by the acquirer processing server 110 and/or issuer processing server 102) to identify the blockchain transaction that corresponds to the response transaction message, such as in instances where the acquirer processing server 110 and issuer processing server 102 may be processing multiple transactions.

If validation of the record of guaranteed payment is successful, then the acquirer processing server 110 may instantaneously credit a transaction account associated with the merchant system 108 for the transaction amount. In instances where the blockchain network 114 is used and a blockchain transaction processed, the acquirer processing server 110 may receive the funds for the payment transaction via the blockchain, which may be in the form of a blockchain currency or a fiat currency. In some cases, the blockchain transaction may be used to convey the record of guaranteed payment, with the issuer processing server 102 providing funds to the acquirer processing server 110 using traditional settlement and clearing processes. Due to the guarantee, the acquirer processing server 110 may still instantaneously credit the transaction account of the merchant system 108 due to the guarantee that the issuer processing server 102 is supplying funds to the acquirer processing server 110.

In some embodiments, the consumer 104 may request for the withholding of funds for instant payment to a merchant prior to the initiation of a payment transaction. In such an embodiment, the consumer 104 may electronically submit an allocation request to the issuer processing server 102 via a computing device and a suitable communication network, such as the Internet. The allocation request may include an identification value associated with the transaction account for identification thereof, such as the primary account number, and an amount to be allocated/withheld for instant payment. In some cases, the consumer 104 may also provide information associated with the future purchase for which instant payment is to be made, such as merchant information (e.g., a merchant identifier, merchant category code, etc.), product information, a transaction time and/or date range, a geographic location and/or area, etc. The issuer processing server 102 may allocate the indicated amount in the account balance for an upcoming instant payment, which may render the amount unavailable for use in any other payment transaction. In some cases, the issuer processing server 102 may directly deduct the indicated amount from the transaction account. In other cases, the issuer processing server 102 may place the indicated amount in escrow, and may return the amount to the transaction account if the instant payment does not occur.

In such an embodiment, when a transaction message is received by the issuer processing server 102 via the payment rails that includes guaranteed payment data indicating that instant payment is to be made, the issuer processing server 102 may verify that the transaction conforms to any information provided by the consumer 104 for the instant payment, such as that the transaction time is within a provided transaction time range, that the merchant identifier included in the transaction message matches a merchant identifier provided by the consumer 104, etc. The issuer processing server 102 may also verify that the amount allocated by the consumer 104 is greater than or equal to the transaction amount. In some embodiments, if the transaction amount is greater than the allocated amount, the issuer processing server 102 may contact the consumer 104 for additional verification. For example, if the transaction amount is higher than anticipated by the consumer 104 and the transaction account has sufficient balance and/or credit to cover the additional amount, the issuer processing server 102 may electronically transmit a data signal to a mobile communication device associated with the consumer 104 that is superimposed with a verification request, which may indicate that the transaction amount is above what was allocated for instant payment and request verification. The consumer 104 may then provide verification that instant payment is to be made for the full transaction amount, which may be electronically transmitted back to the issuer processing server 102 using the computing device. The issuer processing server 102 may then process the payment transaction and record of guaranteed payment as discussed above.

Methods and systems discussed herein enable an issuer processing server 102 to provide a guaranteed payment to an acquirer processing server 110 such that instantaneous payment for a payment transaction may be made to a merchant system 108. Via the use of a record of guaranteed payment, the methods discussed herein enable a guarantee of payment using a plurality of different payment instruments 106 and for a plurality of different transaction types, including e-commerce transactions where the consumer 104 may initiate a transaction with the merchant system 108 remotely, such as via the Internet.

Issuer Processing Server

Figure 2:
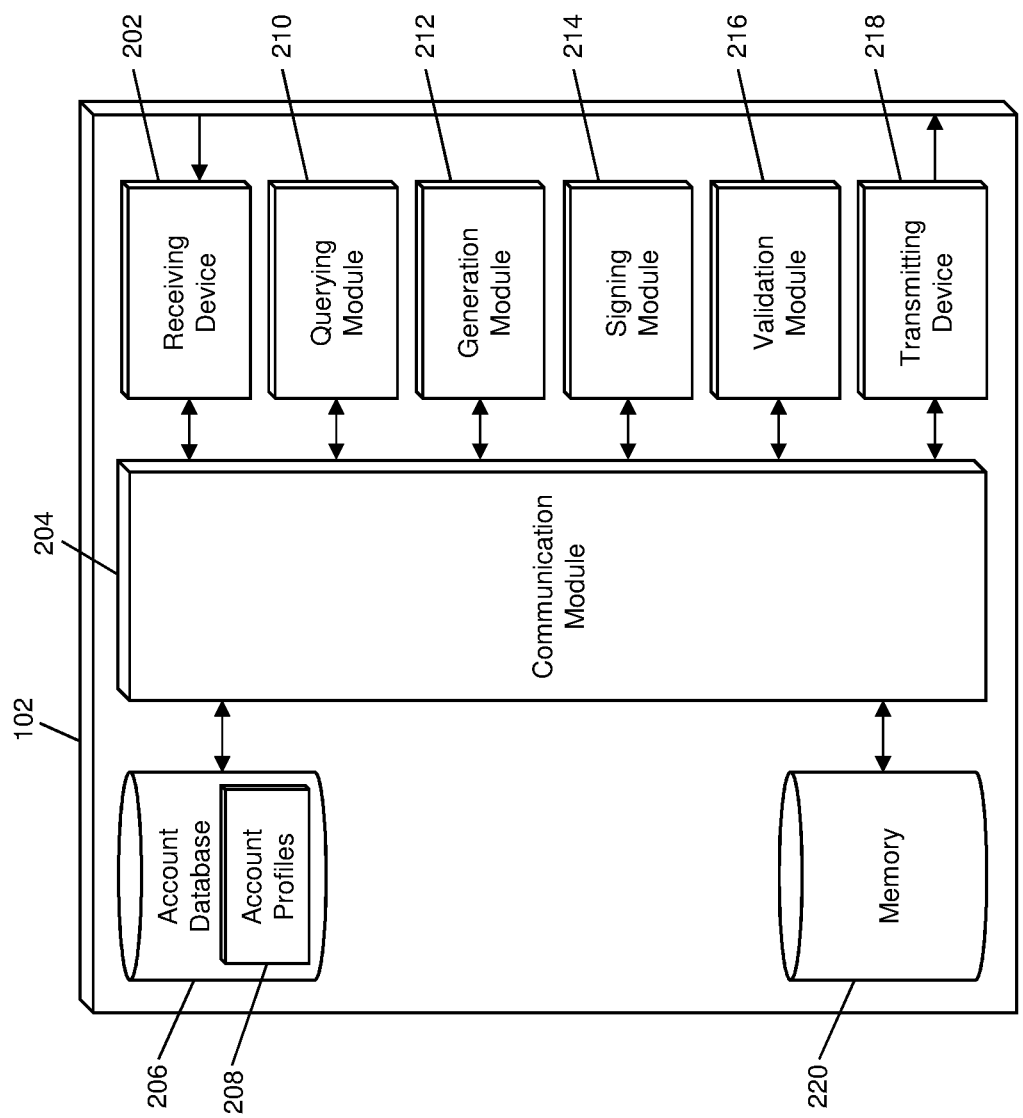
FIG. 2 is a block diagram illustrating the processing server of FIG. 1 for the processing of guaranteed electronic transactions in accordance with exemplary embodiments.

FIG. 2 illustrates an embodiment of the issuer processing server 102 of the system 100. It will be apparent to persons having skill in the relevant art that the embodiment of the issuer processing server 102 illustrated in FIG. 2 is provided as illustration only and may not be exhaustive to all possible configurations of the issuer processing server 102 suitable for performing the functions as discussed herein. For example, the computer system 600 illustrated in FIG. 6 and discussed in more detail below may be a suitable configuration of the issuer processing server 102.

The issuer processing server 102 may include a receiving device 202. The receiving device 202 may be configured to receive data over one or more networks via one or more network protocols. In some embodiments, the receiving device 202 may be configured to receive data over the payment rails, such as using specially configured infrastructure associated with payment networks 112 for the transmission of transaction messages that include sensitive financial data and information. In some instances, the receiving device 202 may also be configured to receive data from consumers 104, computing devices, merchant systems 108, acquirer issuer processing servers 110, payment networks 112, blockchain networks 114, and other entities via alternative networks, such as the Internet. In some embodiments, the receiving device 202 may be comprised of multiple devices, such as different receiving devices for receiving data over different networks, such as a first receiving device for receiving data over payment rails and a second receiving device for receiving data over the Internet. The receiving device 202 may receive electronically data signals that are transmitted, where data may be superimposed on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by payment networks 112 that may be superimposed with or otherwise include transaction message for payment transactions. The transaction messages may be formatted pursuant to one or more standards, such as the ISO 8583 standard, and include a plurality of data elements including data elements configured to store primary account numbers, transaction amounts, guaranteed payment data, and additional transaction data. In some embodiments, the received device 202 may also be configured to receive data signals electronically transmitted by computing devices associated with consumers 104, such as may be superimposed with allocation requests. Allocation requests may include identification information associated with a transaction account and an allocation amount. Allocation requests may also include additional information associated with a future purchase for which instant payment is requested.

The issuer processing server 102 may also include a communication module 204. The communication module 204 may be configured to transmit data between modules, engines, databases, memories, and other components of the issuer processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the issuer processing server 102 and external components of the issuer processing server

102, such as externally connected databases, display devices, input devices, etc. The issuer processing server 102 may also include a processing device. The processing device may be configured to perform the functions of the issuer processing server 102 discussed herein as will be apparent to persons having skill in the relevant art. In some embodiments, the processing device may include and/or be comprised of a plurality of engines and/or modules specially configured to perform one or more functions of the processing device, such as a querying module 210, a generation module 212, a signing module 214, a validation module 216, etc. As used herein, the term "module" may be software or hardware particularly programmed to receive an input, perform one or more processes using the input, and provide an output. The input, output, and processes performed by various modules will be apparent to one skilled in the art based upon the present disclosure.

The issuer processing server 102 may include an account database 206. The account database 206 may be configured to store a plurality of account profiles 208 using a suitable data storage format and schema. The account database 206 may be a relational database that utilizes structured query language for the storage, identification, modifying, updating, accessing, etc. of structured data sets stored therein. Each account profile 208 may be a structured data set configured to store data related to a transaction account. Each account profile 208 may include at least a primary account number and an account balance. In some instances, the account profile 208 may also include additional identification information, such as an identification value to be used in allocation requests and other data exchanges. The account profile 208 may also include additional information suitable for performing the functions discussed herein, such as communication details for transmitting communications to the consumer 104 or other entity associated with the transaction account, such as details for transmitting verification requests to a computing device for verification of an amount for instant payment in a payment transaction.

The issuer processing server 102 may include a querying module 210. The querying module 210 may be configured to execute queries on databases to identify information. The querying module 210 may receive one or more data values or query strings, and may execute a query string based thereon on an indicated database, such as the account database 206, to identify information stored therein. The querying module 210 may then output the identified information to an appropriate engine or module of the issuer processing server 102 as necessary. The querying module 210 may, for example, execute a query on the account database 206 to identify an account profile 208 related to a transaction account used in a payment transaction based on a correspondence between the primary account number stored therein and the primary account number stored in a corresponding data element included in a received transaction message for the payment transaction.

The issuer processing server 102 may also include a generation module 212. The generation module 212 may be configured to receive one or more instructions for the generation of data, may generate the data, and may output the generated data to another module or engine of the issuer processing server 102. In some instances, instructions for the generation of data may be accompanied by data used in the generation. For example, the generation module 212 may be configured to generate a record of guaranteed payment for a payment transaction, which may be generated based on a received transaction message or data included therein. In instances where a record of guaranteed payment is a blockchain transaction, the generation module 212 may be configured to generate a destination address for the blockchain transaction using a public key, such as may be parsed from the guaranteed payment data stored in a corresponding data element included in a received transaction message.

In some embodiments, the issuer processing server 102 may include a signing module 214. The signing module 214 may be configured to receive data as input, may digitally sign the data, and may output the digitally signed data. In some instances, the signing module 214 may also receive one or more keys and/or algorithms to be used in the signing. In other instances, the signing module 214 may identify (e.g., via the querying module 210) one or more keys and/or algorithms to be used in digitally signing the input data. The signing module 214 may, for example, digitally sign a blockchain transaction using a private key associated with the issuer processing server 102 and an algorithm associated with the corresponding blockchain network 114, prior of submission of the blockchain transaction to the blockchain network 114.

The issuer processing server 102 may further include a validation module 216. The validation module 216 may be configured to receive data, may perform validation of the data, and may output a result of the validation (e.g., successful, unsuccessful, partially successful, etc.) to another module or engine of the issuer processing server 102. For example, the validation module 216 may be configured to validate a received transaction message indicated for instant payment as corresponding to a previously received allocation request, such as by comparing information provided in the allocation request with data stored in corresponding data elements in the transaction message. The validation module 216 may also be configured to validate payment transactions generally for approval or denial thereof using traditional methods, such as to validate that a transaction account has a sufficient balance for a payment transaction, validate that the transaction has a low likelihood of fraud, etc. Additional validations performed as part of the traditional processing of a payment transaction will be apparent to persons having skill in the relevant art.

The issuer processing server 102 may also include a transmitting device 218. The transmitting device 218 may be configured to transmit data over one or more networks via one or more network protocols. In some embodiments, the transmitting device 218 may be configured to transmit data over the payment rails, such as using specially configured infrastructure associated with payment networks 112 for the transmission of transaction messages that include sensitive financial data and information, such as identified payment credentials. In some instances, the transmitting device 218 may be configured to transmit data to consumers 104, computing devices, merchant systems 108, acquirer processing servers 110, payment networks 112, blockchain networks 114, and other entities via alternative networks, such as the Internet. In some embodiments, the transmitting device 218 may be comprised of multiple devices, such as different transmitting devices for transmitting data over different networks, such as a first transmitting device for transmitting data over the payment rails and a second transmitting device for transmitting data over the Internet. The transmitting device 218 may electronically transmit data signals that have data superimposed that may be parsed by a receiving computing device. In some instances, the transmitting device 218 may include one or more modules for superimposing, encoding, or otherwise formatting data into data signals suitable for transmission.

The transmitting device 218 may be configured to electronically transmit data signals to payment networks 112 that are superimposed with or otherwise include response transaction messages, which may indicate approval or denial of a corresponding payment transaction, and which may also include data corresponding to a record of guaranteed payment, as applicable. The transmitting device 218 may also be configured to electronically transmit data signals to blockchain networks 114 or computing nodes associated therewith, which may be superimposed with blockchain transactions as records of guaranteed payment for posting to a corresponding blockchain. In some embodiments, the transmitting device 218 may be further configured to electronically transmit data signals to computing devices associated with a consumer 104, such as for conveying verification requests requesting verification of payment transactions for instant payment.

The issuer processing server 102 may also include a memory 220. The memory 220 may be configured to store data for use by the issuer processing server 102 in performing the functions discussed herein. The memory 220 may be configured to store data using suitable data formatting methods and schema and may be any suitable type of memory, such as read-only memory, random access memory, etc. The memory 220 may include, for example, currency and geographic location associations, encryption keys and algorithms, communication protocols and standards, data formatting standards and protocols, program code for modules and application programs of the processing device, and other data that may be suitable for use by the issuer processing server 102 in the performance of the functions disclosed herein as will be apparent to persons having skill in the relevant art.

Processing of Guaranteed Payment Transactions

Figure 3A:
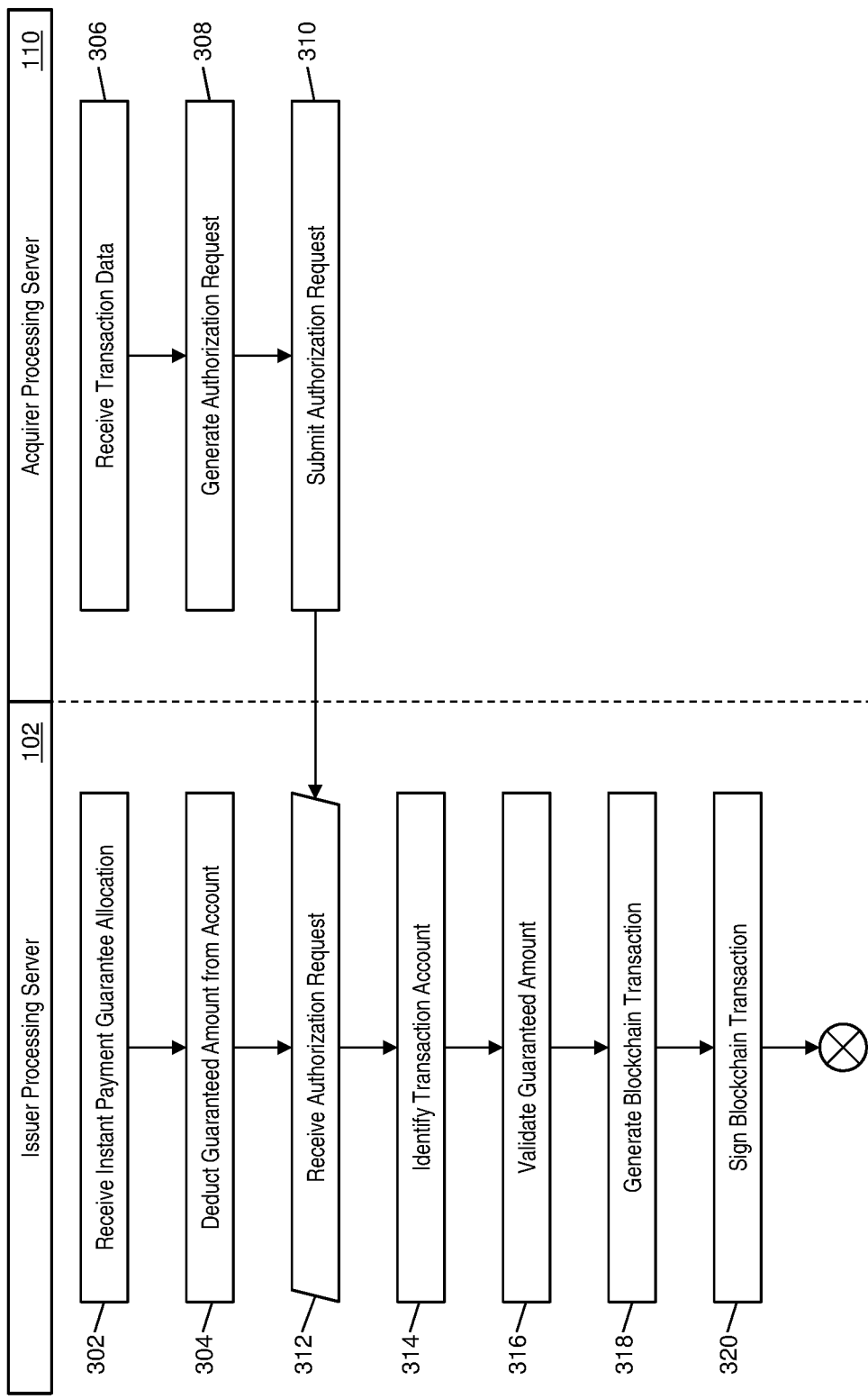
FIGS. 3A and 3B are a flow diagram illustrating a process for the processing of a guaranteed electronic transaction with instantaneous payment to a merchant using the system of FIG. 1 in accordance with exemplary embodiments.
Figure 3B:
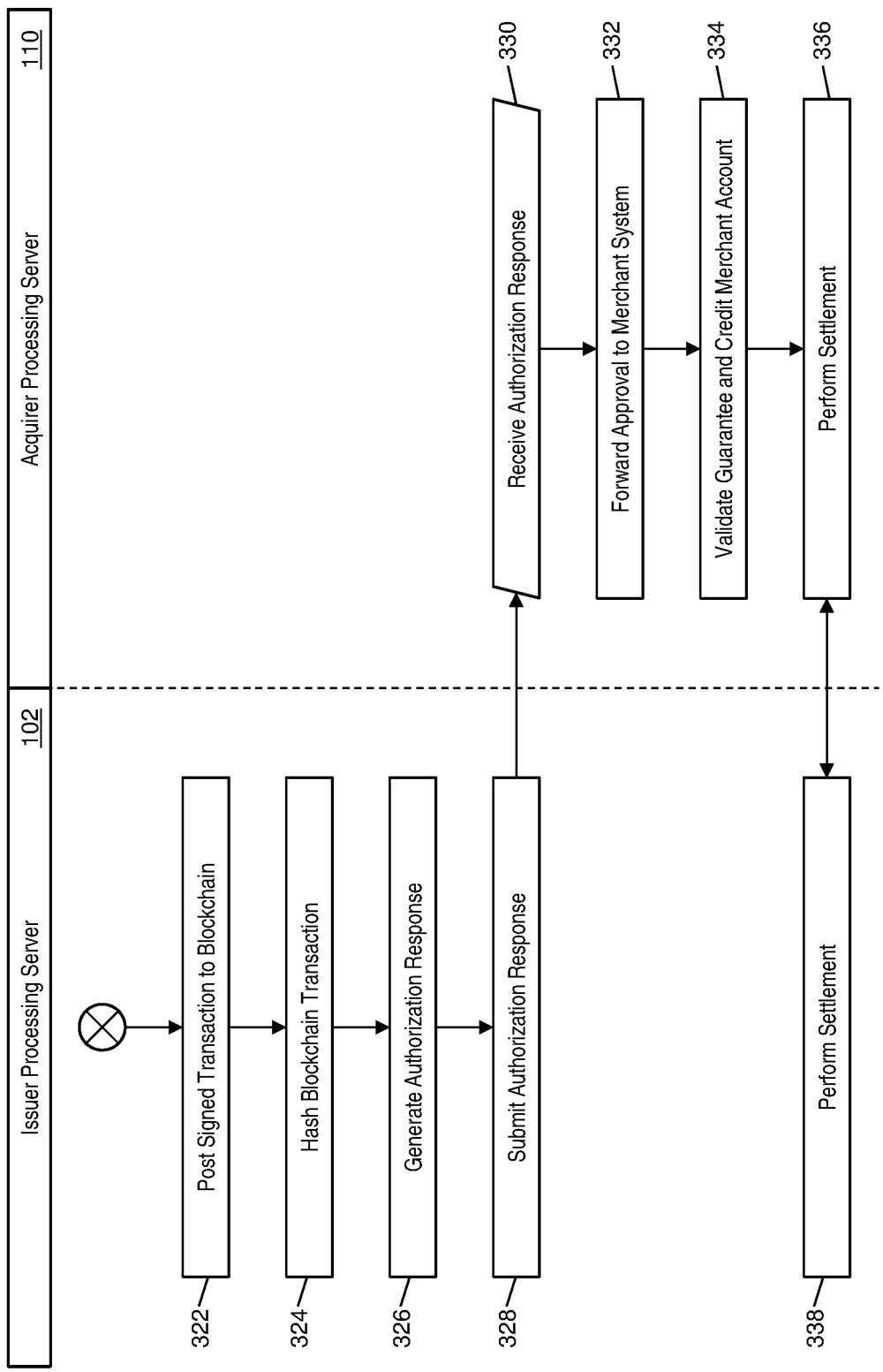

FIGS. 3A and 3B illustrate a process for the processing of a guaranteed payment transaction for instantaneous payment to a merchant via a record of guaranteed payment.

In step 302, the receiving device 202 of the issuer processing server 102 may receive an allocation request electronically submitted by a consumer 104 (e.g., via a suitable computing device) for allocation of an amount for guaranteed instant payment for an upcoming transaction. The allocation request may include at least a guaranteed amount and an identification value associated with the corresponding transaction account. In step 304, the querying module 210 of the issuer processing server 102 may execute a query on the account database 206 to deduct the guaranteed amount from an account balance included in an account profile 208 in the account database 206 that includes the identification value included in the allocation request. In some instances, the identification value may be a primary account number corresponding to the related transaction account.

In step 306, the acquirer processing server 110 may receive transaction data for a payment transaction from the merchant system 108. The transaction data may include payment details read from the payment instrument 106, including at least a primary account number, a transaction amount, an indication that instant payment is to be made, and any additional data used in the processing of the payment transaction, such as a transaction time, transaction date, geographic location, consumer data, merchant data, point of sale data, product data, offer data, loyalty data, reward data, etc. In step 308, the acquirer processing server 110 may generate an authorization request for the payment transaction. The authorization request may be a transaction message formatted pursuant to one or more standards, such as the ISO 8583 standard, that includes a message type indicator indicative of an authorization request and a plurality of data elements, including data elements configured to store the primary account number, transaction amount, guaranteed payment data, and additional transaction data. The guaranteed payment data may include a destination address or public key associated with the acquirer processing server 110 for use in the receipt of blockchain transactions using the blockchain network 114, and a network identifier associated with the blockchain network 114.

In step 310, the acquirer processing server 110 may electronically transmit the authorization request to the payment network 112 via the payment rails, which may then forward the authorization request to the issuer processing server 102 via the payment rails. In step 312, the receiving device 202 of the issuer processing server 102 may receive the authorization request. In step 314, the querying module 210 of the issuer processing server 102 may execute a query on the account database 206 of the issuer processing server 102 to identify an account profile 208 related to the transaction account used in the payment transaction, by identifying an account profile 208 that includes the primary account number stored in the corresponding data element included in the received authorization request.

In step 316, the validation module 216 of the issuer processing server 102 may validate the guaranteed amount that was allocated in the transaction account as sufficient to cover the transaction amount as stored in the corresponding data element included in the received authorization request. In instances where the guaranteed amount may be insufficient, step 316 may include the requesting and receipt of additional verification from the consumer 104 of instant payment to the merchant system 108 for the full transaction amount, as discussed herein.

In step 318, the generation module 212 of the issuer processing server 102 may generate a blockchain transaction as a record of guaranteed payment for payment of the transaction amount to the acquirer processing server 110 for instantaneous payment to the merchant system 108 for the payment transaction. The blockchain transaction may include payment of the transaction amount to the destination address provided by the acquirer processing server 110 and included in the guaranteed payment data. In instances where a public key was supplied in place of the destination address, the generation module 212 may generate the destination address from the public key using a suitable method and algorithm. In step 320, the signing module 214 of the issuer processing server 102 may digitally sign the generated blockchain transaction using a private key and suitable algorithm as associated with the blockchain network 114 corresponding to the network identifier included in the guaranteed payment data included in the received authorization request.

In step 322, the transmitting device 218 of the issuer processing server 102 may electronically transmit the digitally signed blockchain transaction to the blockchain network 114 or a corresponding computing node for posting to the blockchain. In some embodiments, the issuer processing server 102 may be a node of the blockchain network 114. In such embodiments, the issuer processing server 102 may directly post the blockchain transaction to the blockchain using methods and systems that will be apparent to persons having skill in the relevant art. In step 324, the generation module 212 of the issuer processing server 102 may generate a hash for the blockchain transaction by applying the blockchain transaction to one or more suitable hashing algorithms.

In step 326, the generation module 212 of the issuer processing server 102 may generate an authorization response for the payment transaction. The authorization response may be a modification of the received authorization request or a newly-generated transaction message that is formatted pursuant to one or more standards, such as the ISO 8583 standard, and includes a message type indicator indicative of an authorization response and a plurality of data elements including a data element configured to store a response code indicating that the payment transaction is approved and a data element configured to store at least the hash of the blockchain transaction. In step 328, the transmitting device 218 of the issuer processing server 102 may electronically transmit the authorization response to the payment network 112 via the payment rails, which may then forward the authorization response to the acquirer processing server 110 via the payment rails. In step 330, the acquirer processing server 110 may receive the authorization response.

In step 332, the acquirer processing server 110 may forward a message indicating that the payment transaction was approved to the merchant system 108 via a suitable communication network, such as via the payment rails associated with the payment network 112. In step 334, the acquirer processing server 110 may validate the guarantee for the payment transaction and may credit the transaction account associated with the merchant system 108 for instantaneous payment of the transaction amount. The validation of the guarantee may include retrieving the blockchain from the blockchain network 114 and identifying the posted blockchain transaction for the transfer of the transaction amount to the destination address associated with the acquirer processing server 110. The acquirer processing server 110 may also hash the blockchain transaction using the same hashing algorithm as the issuer processing server 102 and confirm that the hash matches the hash stored in the corresponding data element in the authorization response, such as for additional validation that the blockchain transaction corresponds to the authorization response.

In steps 336 and 338, the acquirer processing server 110 and issuer processing server 102 may perform settlement. Settlement may be performed using traditional processes for settlement between issuing and acquiring financial institutions (e.g., associated with the issuing processing server 102 and acquiring processing server 110, respectively) as will be apparent to persons having skill in the relevant art. In some instances, the blockchain transaction may be used for conveyance of the record of guaranteed payment without actual transfer of currency, where traditional settlement for payment of the transaction amount from the issuing financial institution to the acquiring financial institution is used. In other instances, the blockchain transaction may be used to convey an amount in blockchain currency equivalent to the transaction amount (e.g., or an amount related thereto, such as after deduction or addition of fees, etc.). In such instances, the settlement performed in steps 336 and 338 may not include the payment of funds.

Exemplary Method for Processing a Guaranteed Electronic Transaction

Figure 4:
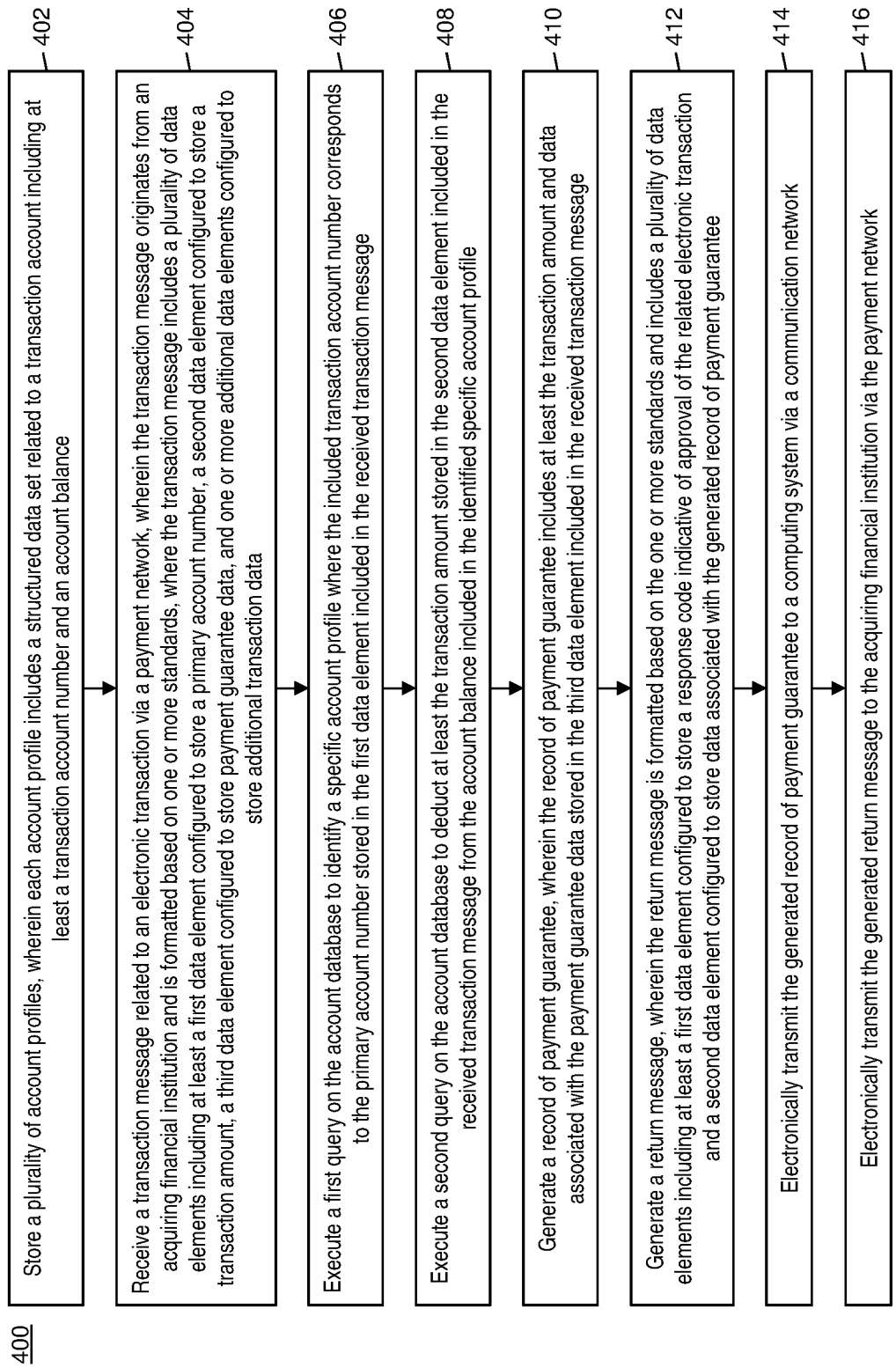
FIG. 4 is a flow chart illustrating an exemplary method for processing a guaranteed electronic transaction in accordance with exemplary embodiments.

FIG. 4 illustrates a method 400 for the processing of a guaranteed electronic transaction, where a record of guaranteed payment is used to facilitate instantaneous payment to a merchant for a payment transaction.

In step 402, a plurality of account profiles may be stored in an account database (e.g., the account database 206) of a processing server (e.g., the issuer processing server 102), wherein each account profile includes a structured data set related to a transaction account including at least a transaction account number and an account balance. In step 404, a transaction message related to an electronic transaction may be received by a receiving device (e.g., the receiving device 202) of the processing server via a payment network (e.g., the payment network 112), wherein the transaction message originates from an acquiring financial institution (e.g., the acquirer processing server 110) and is formatted based on one or more standards, where the transaction message includes a plurality of data elements including at least a first data element configured to store a primary account number, a second data element configured to store a transaction amount, a third data element configured to store payment guarantee data, and one or more additional data elements configured to store additional transaction data.

In step 406, a first query may be executed on the account database by a querying module (e.g., the querying module 210) of the processing server to identify a specific account profile where the included transaction account number corresponds to the primary account number stored in the first data element included in the received transaction message. In step 408, a second query may be executed on the account database by the querying module of the processing server to deduct at least the transaction amount stored in the second data element included in the received transaction message from the account balance included in the identified specific account profile.

In step 410, a record of payment guaranteed may be generated by a generation module (e.g., the generation module 212) of the processing server, wherein the record of payment guarantee includes at least the transaction amount and data associated with the payment guarantee data stored in the third data element included in the received transaction message. In step 412, a return message may be generated by the generation module of the processing server, wherein the return message is formatted based on the one or more standards and includes a plurality of data elements including at least a first data element configured to store a response code indicative of approval of the related electronic transaction and a second data element configured to store data associated with the generated record of payment guarantee.

In step 414, the generated record of payment guarantee may be electronically transmitted by a transmitting device (e.g., the transmitting device 218) of the processing server to a computing system via a communication network. In step 416, the generated return message may be electronically transmitted by the transmitting device of the processing server to the acquiring financial institution via the payment network.

In one embodiment, the payment guarantee data stored in the third data element included in the received transaction message may include at least a blockchain network identifier and (i) a public key or (ii) a destination address, the record of payment guarantee may be a blockchain transaction for payment of the transaction amount stored in the second data element included in the received transaction message to (i) the destination address or (ii) a destination address associated with the public key, and the computing system may be a node in a blockchain network (e.g., the blockchain network 114) corresponding to the blockchain network identifier. In a further embodiment, the method 400 may further include generating, by the generation module of the processing server, the destination address associated with the public key using the public key. In another further embodiment, the method 400 may also include generating, by the generation module of the processing server, a hash value by applying one or more hashing algorithms to the generated record of payment guarantee, wherein the data associated with the generated record of payment guarantee stored in the second data element included in the return message includes the generated hash value. In yet another further embodiment, the method 400 may further include signing, by a signing module (e.g., the signing module 214) of the processing server, the blockchain transaction prior to transmission to the computing system.

In some embodiments, the second query may be executed by the querying module prior to receipt of the transaction message by the receiving device. In a further embodiment, the method 400 may also include validating, by a validation module (e.g., the validation module 216) of the processing server, an amount deducted from the account balance included in the identified specific account profile via the second query as greater than the transaction amount stored in the second data element included in the received transaction message. In one embodiment, the received transaction message may further include a message type indicator indicative of an authorization request. In some embodiments, the generated return message may include a message type indicator indicative of an authorization response. In one embodiment, the return message may be generated by the generation module by modifying the received transaction message.

Payment Transaction Processing System and Process

Figure 5:
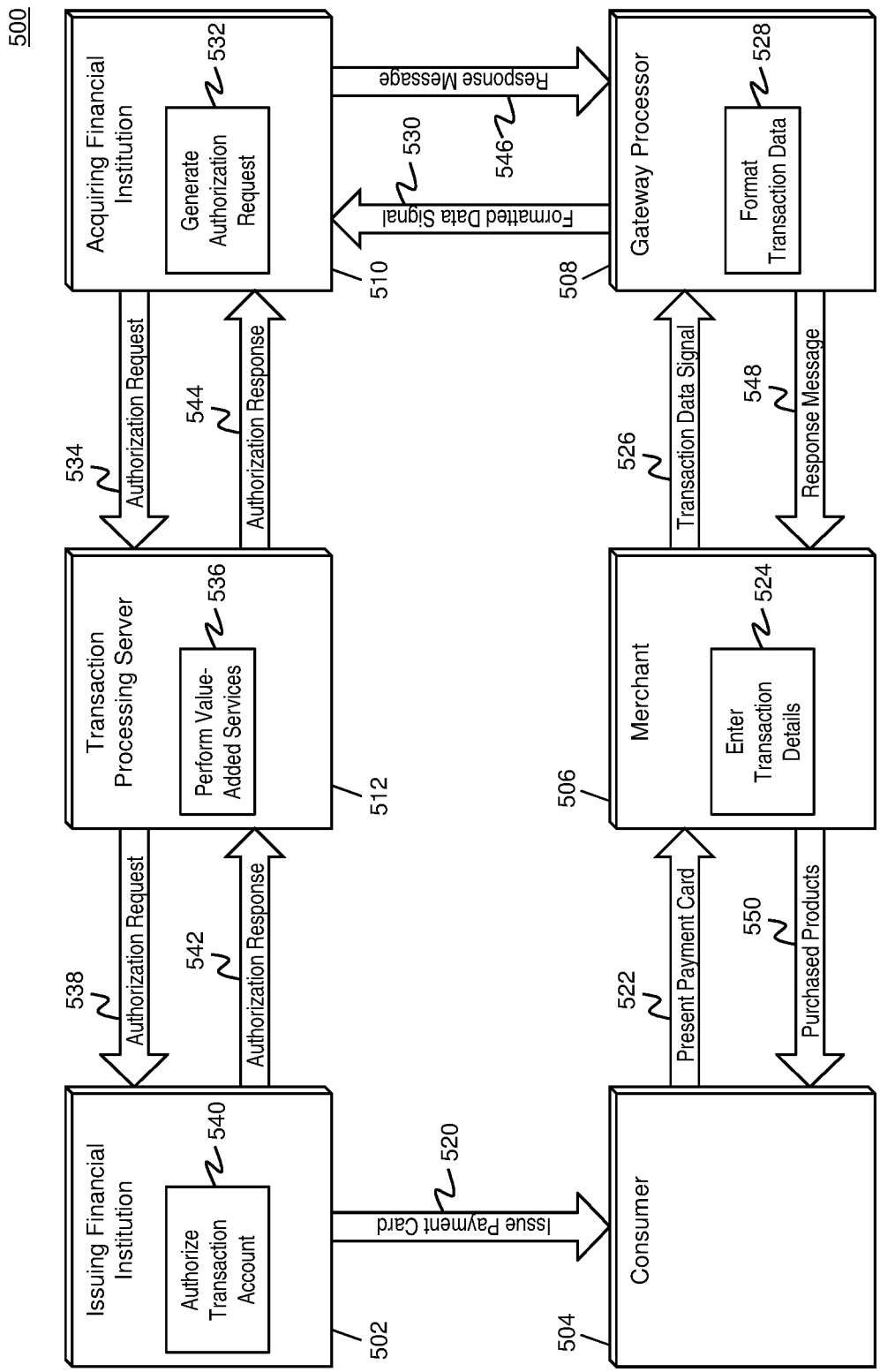
FIG. 5 is a flow diagram illustrating the processing of a payment transaction in accordance with exemplary embodiments.

FIG. 5 illustrates a transaction processing system and a process 500 for the processing of payment transactions in the system. The process 500 and steps included therein may be performed by one or more components of the system 100 discussed above, such as the issuer processing server 102, consumer 104, payment instrument 106, merchant system 108, acquirer processing server 110, payment network 112, etc. The processing of payment transactions using the system and process 500 illustrated in FIG. 5 and discussed below may utilize the payment rails, which may be comprised of the computing devices and infrastructure utilized to perform the steps of the process 500 as specially configured and programmed by the entities discussed below, including the transaction processing server 512, which may be associated with one or more payment networks configured to processing payment transactions. It will be apparent to persons having skill in the relevant art that the process 500 may be incorporated into the processes illustrated in FIGS. 3A, 3B, and 4, discussed above, with respect to the step or steps involved in the processing of a payment transaction. In addition, the entities discussed herein for performing the process 500 may include one or more computing devices or systems configured to perform the functions discussed below. For instance, the merchant 506 may be comprised of one or more point of sale devices, a local communication network, a computing server, and other devices configured to perform the functions discussed below.

In step 520, an issuing financial institution 502 may issue a payment card or other suitable payment instrument to a consumer 504. The issuing financial institution may be a financial institution, such as a bank, or other suitable type of entity that administers and manages payment accounts and/or payment instruments for use with payment accounts that can be used to fund payment transactions. The consumer 504 may have a transaction account with the issuing financial institution 502 for which the issued payment card is associated, such that, when used in a payment transaction, the payment transaction is funded by the associated transaction account. In some embodiments, the payment card may be issued to the consumer 504 physically. In other embodiments, the payment card may be a virtual payment card or otherwise provisioned to the consumer 504 in an electronic format.

In step 522, the consumer 504 may present the issued payment card to a merchant 506 for use in funding a payment transaction. The merchant 506 may be a business, another consumer, or any entity that may engage in a payment transaction with the consumer 504. The payment card may be presented by the consumer 504 via providing the physical card to the merchant 506, electronically transmitting (e.g., via near field communication, wireless transmission, or other suitable electronic transmission type and protocol) payment details for the payment card, or initiating transmission of payment details to the merchant 506 via a third party. The merchant 506 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 524, the merchant 506 may enter transaction details into a point of sale computing system. The transaction details may include the payment details provided by the consumer 504 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 506 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 506 may be an online retailer in an e-commerce transaction. In such embodiments, the transaction details may be entered in a shopping cart or other repository for storing transaction data in an electronic transaction as will be apparent to persons having skill in the relevant art.

In step 526, the merchant 506 may electronically transmit a data signal superimposed with transaction data to a gateway processor 508. The gateway processor 508 may be an entity configured to receive transaction details from a merchant 506 for formatting and transmission to an acquiring financial institution 510. In some instances, a gateway processor 508 may be associated with a plurality of merchants 506 and a plurality of acquiring financial institutions 510. In such instances, the gateway processor 508 may receive transaction details for a plurality of different transactions involving various merchants, which may be forwarded on to appropriate acquiring financial institutions 510. By having relationships with multiple acquiring financial institutions 510 and having the requisite infrastructure to communicate with financial institutions using the payment rails, such as using application programming interfaces associated with the gateway processor 508 or financial institutions used for the submission, receipt, and retrieval of data, a gateway processor 508 may act as an intermediary for a merchant 506 to be able to conduct payment transactions via a single communication channel and format with the gateway processor 508, without having to maintain relationships with multiple acquiring financial institutions 510 and payment processors and the hardware associated thereto. Acquiring financial institutions 510 may be financial institutions, such as banks, or other entities that administers and manages payment accounts and/or payment instruments for use with payment accounts. In some instances, acquiring financial institutions 510 may manage transaction accounts for merchants 506. In some cases, a single financial institution may operate as both an issuing financial institution 502 and an acquiring financial institution 510.

The data signal transmitted from the merchant 506 to the gateway processor 508 may be superimposed with the transaction details for the payment transaction, which may be formatted based on one or more standards. In some embodiments, the standards may be set forth by the gateway processor 508, which may use a unique, proprietary format for the transmission of transaction data to/from the gateway processor 508. In other embodiments, a public standard may be used, such as the International Organization for Standardization's ISO 8583 standard. The standard may indicate the types of data that may be included, the formatting of the data, how the data is to be stored and transmitted, and other criteria for the transmission of the transaction data to the gateway processor 508.

In step 528, the gateway processor 508 may parse the transaction data signal to obtain the transaction data superimposed thereon and may format the transaction data as necessary. The formatting of the transaction data may be performed by the gateway processor 508 based on the proprietary standards of the gateway processor 508 or an acquiring financial institution 510 associated with the payment transaction. The proprietary standards may specify the type of data included in the transaction data and the format for storage and transmission of the data. The acquiring financial institution 510 may be identified by the gateway processor 508 using the transaction data, such as by parsing the transaction data (e.g., deconstructing into data elements) to obtain an account identifier included therein associated with the acquiring financial institution 510. In some instances, the gateway processor 508 may then format the transaction data based on the identified acquiring financial institution 510, such as to comply with standards of formatting specified by the acquiring financial institution 510. In some embodiments, the identified acquiring financial institution 510 may be associated with the merchant 506 involved in the payment transaction, and, in some cases, may manage a transaction account associated with the merchant 506.

In step 530, the gateway processor 508 may electronically transmit a data signal superimposed with the formatted transaction data to the identified acquiring financial institution 510. The acquiring financial institution 510 may receive the data signal and parse the signal to obtain the formatted transaction data superimposed thereon. In step 532, the acquiring financial institution may generate an authorization request for the payment transaction based on the formatted transaction data. The authorization request may be a specially formatted transaction message that is formatted pursuant to one or more standards, such as the ISO 8583 standard and standards set forth by a payment processor used to process the payment transaction, such as a payment network. The authorization request may be a transaction message that includes a message type indicator indicative of an authorization request, which may indicate that the merchant 506 involved in the payment transaction is requesting payment or a promise of payment from the issuing financial institution 502 for the transaction. The authorization request may include a plurality of data elements, each data element being configured to store data as set forth in the associated standards, such as for storing an account number, application cryptogram, transaction amount, issuing financial institution 502 information, etc.

In step 534, the acquiring financial institution 510 may electronically transmit the authorization request to a transaction processing server 512 for processing. The transaction processing server 512 may be comprised of one or more computing devices as part of a payment network configured to process payment transactions. In some embodiments, the authorization request may be transmitted by a transaction processor at the acquiring financial institution 510 or other entity associated with the acquiring financial institution. The transaction processor may be one or more computing devices that include a plurality of communication channels for communication with the transaction processing server 512 for the transmission of transaction messages and other data to and from the transaction processing server 512. In some embodiments, the payment network associated with the transaction processing server 512 may own or operate each transaction processor such that the payment network may maintain control over the communication of transaction messages to and from the transaction processing server 512 for network and informational security.

In step 536, the transaction processing server 512 may perform value-added services for the payment transaction. Value-added services may be services specified by the issuing financial institution 502 that may provide additional value to the issuing financial institution 502 or the consumer 504 in the processing of payment transactions. Value-added services may include, for example, fraud scoring, transaction or account controls, account number mapping, offer redemption, loyalty processing, etc. For instance, when the transaction processing server 512 receives the transaction, a fraud score for the transaction may be calculated based on the data included therein and one or more fraud scoring algorithms and/or engines. In some instances, the transaction processing server 512 may first identify the issuing financial institution 502 associated with the transaction, and then identify any services indicated by the issuing financial institution 502 to be performed. The issuing financial institution 502 may be identified, for example, by data included in a specific data element included in the authorization request, such as an issuer identification number. In another example, the issuing financial institution 502 may be identified by the primary account number stored in the authorization request, such as by using a portion of the primary account number (e.g., a bank identification number, issuer identification number, etc.) for identification.

In step 538, the transaction processing server 512 may electronically transmit the authorization request to the issuing financial institution 502. In some instances, the authorization request may be modified, or additional data included in or transmitted accompanying the authorization request as a result of the performance of value-added services by the transaction processing server 512. In some embodiments, the authorization request may be transmitted to a transaction processor (e.g., owned or operated by the transaction processing server 512) situated at the issuing financial institution 502 or an entity associated thereof, which may forward the authorization request to the issuing financial institution 502.

In step 540, the issuing financial institution 502 may authorize the transaction account for payment of the payment transaction. The authorization may be based on an available credit amount for the transaction account and the transaction amount for the payment transaction, fraud scores provided by the transaction processing server 512, and other considerations that will be apparent to persons having skill in the relevant art. The issuing financial institution 502 may modify the authorization request to include a response code indicating approval (e.g., or denial if the transaction is to be denied) of the payment transaction. The issuing financial institution 502 may also modify a message type indicator for the transaction message to indicate that the transaction message is changed to be an authorization response. In step 542, the issuing financial institution 502 may transmit (e.g., via a transaction processor) the authorization response to the transaction processing server 512.

In step 544, the transaction processing server 512 may forward the authorization response to the acquiring financial institution 510 (e.g., via a transaction processor). In step 546, the acquiring financial institution may generate a response message indicating approval or denial of the payment transaction as indicated in the response code of the authorization response, and may transmit the response message to the gateway processor 508 using the standards and protocols set forth by the gateway processor 508. In step 548, the gateway processor 508 may forward the response message to the merchant 506 using the appropriate standards and protocols. In step 550, assuming the transaction was approved, the merchant 506 may then provide the products purchased by the consumer 504 as part of the payment transaction to the consumer 504.

In some embodiments, once the process 500 has completed, payment from the issuing financial institution 502 to the acquiring financial institution 510 may be performed. In some instances, the payment may be made immediately or within one business day. In other instances, the payment may be made after a period of time, and in response to the submission of a clearing request from the acquiring financial institution 510 to the issuing financial institution 502 via the transaction processing server 502. In such instances, clearing requests for multiple payment transactions may be aggregated into a single clearing request, which may be used by the transaction processing server 512 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 540), the transaction processing server 512 may be configured to perform authorization of transactions on behalf of the issuing financial institution 502. Such actions may be referred to as "stand-in processing," where the transaction processing server "stands in" as the issuing financial institution 502. In such instances, the transaction processing server 512 may utilize rules set forth by the issuing financial institution 502 to determine approval or denial of the payment transaction, and may modify the transaction message accordingly prior to forwarding to the acquiring financial institution 510 in step 544. The transaction processing server 512 may retain data associated with transactions for which the transaction processing server 512 stands in, and may transmit the retained data to the issuing financial institution 502 once communication is reestablished. The issuing financial institution 502 may then process transaction accounts accordingly to accommodate for the time of lost communication.

In another example, if the transaction processing server 512 is unavailable for submission of the authorization request by the acquiring financial institution 510, then the transaction processor at the acquiring financial institution 510 may be configured to perform the processing of the transaction processing server 512 and the issuing financial institution 502. The transaction processor may include rules and data suitable for use in making a determination of approval or denial of the payment transaction based on the data included therein. For instance, the issuing financial institution 502 and/or transaction processing server 512 may set limits on transaction type, transaction amount, etc. that may be stored in the transaction processor and used to determine approval or denial of a payment transaction based thereon. In such instances, the acquiring financial institution 510 may receive an authorization response for the payment transaction even if the transaction processing server 512 is unavailable, ensuring that transactions are processed and no downtime is experienced even in instances where communication is unavailable. In such cases, the transaction processor may store transaction details for the payment transactions, which may be transmitted to the transaction processing server 512 (e.g., and from there to the associated issuing financial institutions 502) once communication is reestablished.

In some embodiments, transaction processors may be configured to include a plurality of different communication channels, which may utilize multiple communication cards and/or devices, to communicate with the transaction processing server 512 for the sending and receiving of transaction messages. For example, a transaction processor may be comprised of multiple computing devices, each having multiple communication ports that are connected to the transaction processing server 512. In such embodiments, the transaction processor may cycle through the communication channels when transmitting transaction messages to the transaction processing server 512, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 510 may identify that an authorization request involves an issuing financial institution 502 (e.g., via the bank identification number or issuer identification number included in the transaction message) for which no value-added services are required. The transaction processor at the acquiring financial institution 510 may then transmit the authorization request directly to the transaction processor at the issuing financial institution 502 (e.g., without the authorization request passing through the transaction processing server 512), where the issuing financial institution 502 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 512 for processing. The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 508, acquiring financial institution 510, etc.) for processing using this advanced network, and to quickly and efficiently receive a response regarding the ability for a consumer 504 to fund the payment transaction.

Computer System Architecture

Figure 6:
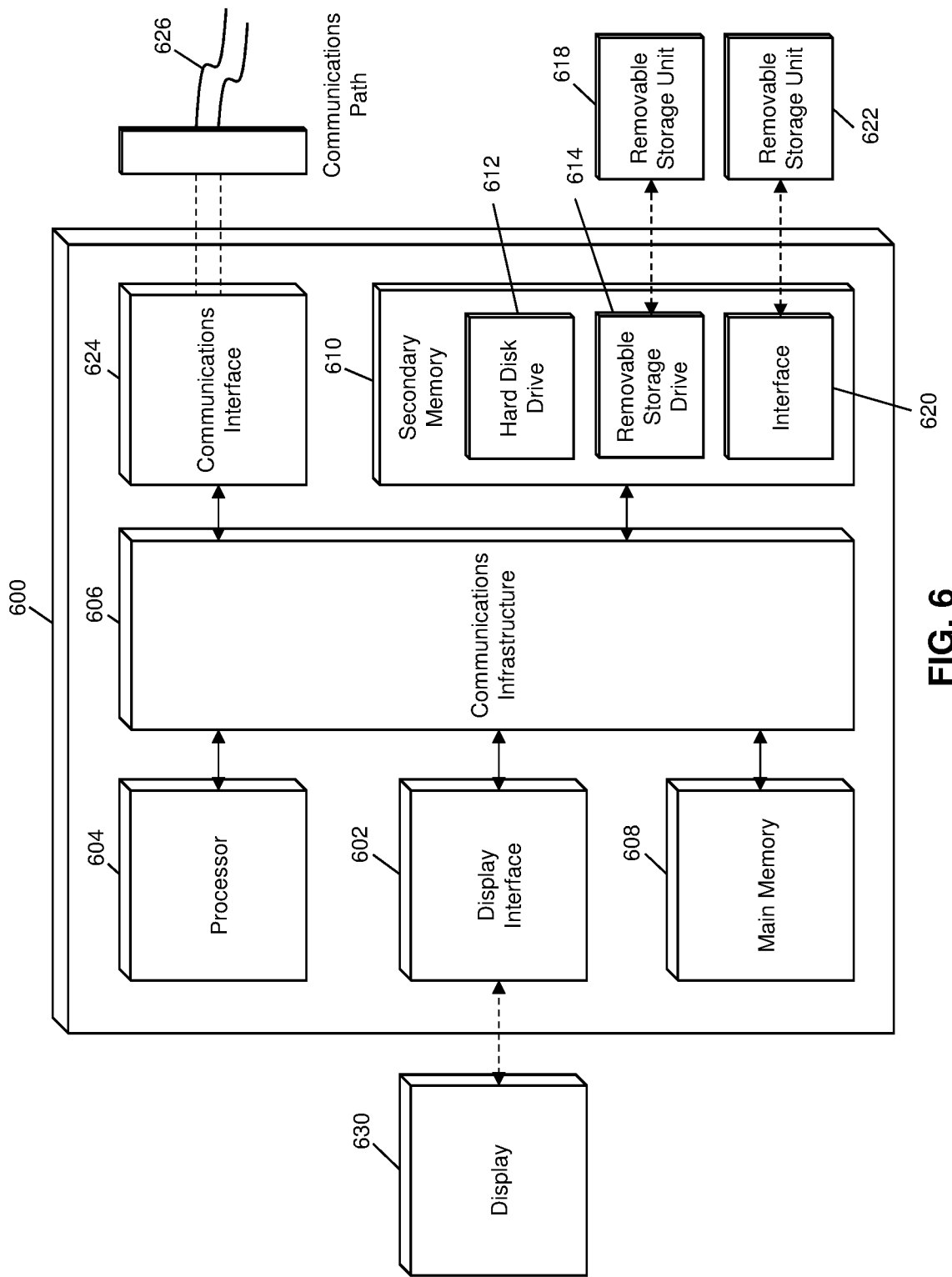
FIG. 6 is a block diagram illustrating a computer system architecture in accordance with exemplary embodiments.

FIG. 6 illustrates a computer system 600 in which embodiments of the present disclosure, or portions thereof, may be implemented as computer-readable code. For example, the issuer processing server 102 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3A, 3B, 4, and 5.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 3A, 3B, 4, and 5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for processing a guaranteed electronic transaction. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for processing a guaranteed electronic transaction, comprising:

storing, in an account database of a processing server, a plurality of account profiles, wherein each account profile includes a structured data set related to a transaction account including at least a transaction account number and an account balance;

prior to an initiation of a payment transaction, receiving, by a receiver of the processing server, a user-selected allocation amount associated with the transaction account, the user-selected allocation amount corresponding to a portion of the account balance reserved for a future transaction, wherein the future transaction is the guaranteed electronic transaction, wherein the processing server renders the portion of the account balance reserved for use in the guaranteed electronic transaction unavailable for non-guaranteed transactions;

receiving, by the receiver of the processing server, a transaction message related to an electronic transaction via a payment network, wherein the transaction message originates from an acquiring financial institution and is formatted based on one or more standards, where the transaction message includes a plurality of data elements including at least a first data element configured to store a primary account number, a second data element configured to store a transaction amount, a third data element configured to store payment guarantee data, and one or more additional data elements configured to store additional transaction data;

executing, by a processing device of the processing server, a first query on the account database to identify a specific account profile where the included transaction account number corresponds to the primary account number stored in the first data element included in the received transaction message;

executing, by the processing device of the processing server, a second query on the account database and deducting one of the transaction amount stored in the second data element included in the received transaction message or the user-selected allocation amount from the portion of the account balance reserved for use in the guaranteed electronic transaction included in the identified specific account profile;

generating, by the processing device of the processing server, a record of payment guarantee, wherein the record of payment guarantee includes one of the transaction amount or the user-selected allocation amount and data associated with the payment guarantee data stored in the third data element included in the received transaction message;

generating, by the processing device of the processing server, a return message, wherein the return message is formatted based on the one or more standards and includes a plurality of data elements including at least a first data element configured to store a response code indicative of approval of the related electronic transaction and a second data element configured to store data associated with the generated record of payment guarantee;

electronically transmitting, by a transmitter of the processing server, the generated record of payment guarantee to a computing system via a communication network; and electronically transmitting, by the transmitter of the processing server, the generated return message to the acquiring financial institution via the payment network, wherein the transmitted generated return message signals to a merchant associated with the acquiring financial institution approval to furnish to a consumer a good or a service associated with the electronic transaction.

2. The method of claim 1, wherein
the payment guarantee data stored in the third data element included in the received transaction message includes at least a blockchain network identifier and (i) a public key or (ii) a destination address,
the record of payment guarantee is a blockchain transaction for payment of the transaction amount or the user-selected allocation amount stored in the second data element included in the received transaction message to (i) the destination address or (ii) a destination address associated with the public key, and
the computing system is a node in a blockchain network corresponding to the blockchain network identifier.

3. The method of claim 2, further comprising:
generating, by the processing device of the processing server, the destination address associated with the public key using the public key.

4. The method of claim 2, further comprising:
generating, by the processing device of the processing server, a hash value by applying one or more hashing algorithms to the generated record of payment guarantee, wherein
the data associated with the generated record of payment guarantee stored in the second data element included in the return message includes the generated hash value.

5. The method of claim 2, further comprising:
signing, by the processing device of the processing server, the blockchain transaction prior to transmission to the computing system.

6. The method of claim 1, wherein the second query is executed by the processing device prior to receipt of the transaction message by the receiver.

7. The method of claim 6, further comprising:
validating, by the processing device of the processing server, an amount deducted from the account balance included in the identified specific account profile via the second query as greater than the transaction amount stored in the second data element included in the received transaction message.

8. The method of claim 1, wherein the received transaction message further includes a message type indicator indicative of an authorization request.

9. The method of claim 1, wherein the generated return message includes a message type indicator indicative of an authorization response.

10. The method of claim 1, wherein the return message is generated by the processing device by modifying the received transaction message.

11. A system for processing a guaranteed electronic transaction, comprising:
an account database of a processing server configured to store a plurality of account profiles, wherein each account profile includes a structured data set related to a transaction account including at least a transaction account number and an account balance;
a receiver of the processing server configured to receive prior to an initiation of a payment transaction, a user-selected allocation amount associated with the transaction account, the user-selected allocation amount corresponding to a portion of the account balance reserved for a future transaction, wherein the future transaction is the guaranteed electronic transaction, and wherein the processing server renders the portion of the account balance reserved for use in the guaranteed electronic transaction unavailable for non-guaranteed transactions; and
a transaction message related to an electronic transaction via a payment network, wherein the transaction message originates from an acquiring financial institution and is formatted based on one or more standards, where the transaction message includes a plurality of data elements including at least a first data element configured to store a primary account number, a second data element configured to store a transaction amount, a third data element configured to store payment guarantee data, and one or more additional data elements configured to store additional transaction data;
a processing device of the processing server configured to execute a first query on the account database to identify a specific account profile where the included transaction account number corresponds to the primary account number stored in the first data element included in the received transaction message, and
a second query on the account database to deduct one of the transaction amount stored in the second data element included in the received transaction message or the user-selected allocation amount from the portion of the account balance reserved for use in the guaranteed electronic transaction included in the identified specific account profile;
wherein the processing device of the processing server is configured to generate a record of payment guarantee, wherein the record of payment guarantee includes one of the transaction amount or the user-selected allocation amount and data associated with the payment guarantee data stored in the third data element included in the received transaction message, and
a return message, wherein the return message is formatted based on the one or more standards and includes a plurality of data elements including at least a first data element configured to store a response code indicative of approval of the related electronic transaction and a second data element configured to store data associated with the generated record of payment guarantee; and
a transmitter of the processing server configured to electronically transmit the generated record of payment guarantee to a computing system via a communication network, and
the generated return message to the acquiring financial institution via the payment network, wherein the transmitted generated return message signals to a merchant associated with the acquiring financial institution approval to furnish to a consumer a good or a service associated with the electronic transaction.

12. The system of claim 11, wherein
the payment guarantee data stored in the third data element included in the received transaction message includes at least a blockchain network identifier and (i) a public key or (ii) a destination address,
the record of payment guarantee is a blockchain transaction for payment of the transaction amount or the user-selected allocation amount stored in the second data element included in the received transaction message to (i) the destination address or (ii) a destination address associated with the public key, and
the computing system is a node in a blockchain network corresponding to the blockchain network identifier.

13. The system of claim 12, wherein the processing device of the processing server is further configured to generate the destination address associated with the public key using the public key.

14. The system of claim 12, wherein
the processing device of the processing server is further configured to generate a hash value by applying one or more hashing algorithms to the generated record of payment guarantee, and
the data associated with the generated record of payment guarantee stored in the second data element included in the return message includes the generated hash value.

15. The system of claim 12, wherein the processing device of the processing server is configured to sign the blockchain transaction prior to transmission to the computing system.

16. The system of claim 11, wherein the second query is executed by the processing device prior to receipt of the transaction message by the receiver.

17. The system of claim 16, further comprising:
wherein the processing device of the processing server is configured to validate an amount deducted from the account balance included in the identified specific account profile via the second query as greater than the transaction amount stored in the second data element included in the received transaction message.

18. The system of claim 11, wherein the received transaction message further includes a message type indicator indicative of an authorization request.

19. The system of claim 11, wherein the generated return message includes a message type indicator indicative of an authorization response.

20. The system of claim 11, wherein the return message is generated by the processing device by modifying the received transaction message.

* * * * *